(12) United States Patent
Kim (10) Patent No.: US 8,214,119 B2
(45) Date of Patent: Jul. 3, 2012

(54) METHOD FOR RECOGNIZING REFERENCE POSITION OF WEDGE OF DISK BRAKE FOR VEHICLES

(75) Inventor: Joo Gon Kim, Deajeon (KR)

(73) Assignee: Mando Corporation, Gyeonggi-Do (KR)

( * ) Notice: Subject to any disclaimer, the term of this patent is extended or adjusted under 35 U.S.C. 154(b) by 1030 days.

(21) Appl. No.: 12/118,516

(22) Filed: May 9, 2008

(65) Prior Publication Data
US 2009/0099747 A1 Apr. 16, 2009

(30) Foreign Application Priority Data

Oct. 10, 2007 (KR) .................. 10-2007-0102277
Oct. 10, 2007 (KR) .................. 10-2007-0102278

(51) Int. Cl.
*F16D 55/08* (2006.01)
*G06F 19/00* (2011.01)

(52) U.S. Cl. ............. 701/70; 701/78; 701/83; 188/70 R; 188/71.1; 188/72.7; 188/72.8; 188/343

(58) Field of Classification Search .................. 701/70, 701/71, 76, 77, 78, 81, 83; 188/17, 18 A, 188/18 R, 21, 70 R, 71.1, 72.7, 72.8, 343
See application file for complete search history.

(56) References Cited

U.S. PATENT DOCUMENTS

| | | | | |
|---|---|---|---|---|
| 6,978,868 B2* | 12/2005 | Schautt | ................. | 188/72.7 |
| 7,143,873 B2* | 12/2006 | Pascucci et al. | ............ | 188/72.7 |
| 2008/0230330 A1* | 9/2008 | Herr | ............................. | 188/72.7 |
| 2009/0020377 A1* | 1/2009 | Kim | ............................. | 188/18 A |
| 2010/0116599 A1* | 5/2010 | Kim | ............................. | 188/72.8 |
| 2011/0127123 A1* | 6/2011 | Chun | .......................... | 188/72.7 |

FOREIGN PATENT DOCUMENTS

DE 10156348 C1 4/2003

* cited by examiner

*Primary Examiner* — Kevin Hurley
*Assistant Examiner* — Marc Scharich
(74) *Attorney, Agent, or Firm* — McDermott Will & Emery LLP (57) ABSTRACT

A method for recognizing a reference position of a wedge member of a disk brake for vehicles, which has a disk rotating together with the rotation of a wheel of a vehicle, a movable friction pad rubbing against one surface of the disk and generating braking force, the wedge member having one surface, to which the movable friction pad is attached, and moving in a rotating direction of the disk and moving forward to the disk by a driving motor for generating driving force, a guide member guiding the wedge member to the disk when the wedge member moves in the rotating direction of the disk, and a driving force transfer member screw-connected to a rotary shaft of the driving motor, moving in the rotating direction of the disk by the driving motor, and causing the wedge member to move in the rotating direction of the disk, the method including moving the wedge member to a left end of an operating section and recognizing a position of the left end, when a driver applies a pressure to a pedal; moving the wedge member to a right end of the operating section and recognizing a position of the right end, when the position of the left end is recognized; determining a middle position between the left end and the right end to be a central point of the entire moving distance; and recognizing the middle position as a reference position for controlling braking of the wedge member.

4 Claims, 7 Drawing Sheets

METHOD FOR RECOGNIZING REFERENCE POSITION OF WEDGE OF DISK BRAKE FOR VEHICLES

CROSS-REFERENCE TO RELATED APPLICATION

This application claims the benefit of Korean Patent Application Nos. 2007-0102277 and 2007-0102278, filed Oct. 10, 2007, in the Korean Intellectual Property Office, the disclosure of which is incorporated herein by reference.

BACKGROUND OF THE INVENTION

1. Field of the Invention

The present invention relates to a method for recognizing the reference position of a wedge of a disk brake for vehicles, and more particularly, to a method for recognizing the reference position of a wedge for controlling the braking of a disk brake for vehicles having a wedge member, which moves in the rotating direction of the disk by a driving motor and presses friction pads to the disk.

2. Description of the Related Art

In general, disk brakes for vehicles are apparatuses, which press a portion of a disk, rotating together with the rotation of a wheel, at both sides with friction pads, and thus obtain braking force. Among these disk brakes for vehicles, there is a disk brake for vehicles including a disk rotating together with the rotation of a wheel of a vehicle, a friction pad rubbing against one surface of the disk and generating braking force, a wedge member having one surface, to which the friction pad is attached, moving in the rotating direction of the disk by means of a driving motor generating driving force, and proceeding to the disk, and a guide member guiding the wedge member to the disk in the case that the wedge member moves in the rotating direction of the disk. Here, the wedge member is interposed between the disk and the guide member such that a large braking force can be obtained with a small driving force.

The above disk brake for vehicles further includes a driving force transfer member moving in the rotating direction of the disk by means of the driving motor and causing the wedge member to move in the rotating direction of the disk.

In order to move the driving force transfer member in the rotating direction of the disk, as described above, a male screw is formed on a rotary shaft of the driving motor and a shaft installation hole having a female screw formed on the inner circumferential surface thereof is formed through the driving force transfer member. Thereby, the driving force transfer member moves forward and backward in the rotating direction of the disk according to the rotating direction of the rotary shaft.

The conventional disk brake is characterized in that the driving direction of the motor is varied when front and rear wheels are braked. For example, in order to brake the forward movement, force for moving the wedge member to the left is applied, and in order to brake the backward movement, force for moving the wedge member to the right is applied. Thus, the disk brake using the wedge member must correctly sense positions, such as the position of a brake starting point, the position of a central point, and the position of a control starting point, which will be references for braking later.

However, when the conventional disk brake is suddenly stopped in the course of control or is stopped due to sudden electric discharge, any position of the wedge member in an operable section becomes the initial position.

Further, even in a section, in which the braking force is hardly affected in spite of the movement of a pedal, the driving motor is operated, and thus generates noise.

SUMMARY OF THE INVENTION

Therefore, one aspect of the invention is to provide a method for recognizing the reference position of a wedge for controlling the braking of a disk brake for vehicles having a wedge member, which moves in the rotating direction of the disk by a driving motor and presses friction pads to the disk.

In accordance with one aspect, the present invention provides a method for recognizing the reference position of a wedge of a disk brake for vehicles, which has a disk rotating together with the rotation of a wheel of a vehicle, a movable friction pad rubbing against one surface of the disk and generating braking force, a wedge member having one surface, to which the movable friction pad is attached, and moving in the rotating direction of the disk and moving forward to the disk by a driving motor for generating driving force, a guide member guiding the wedge member to the disk when the wedge member moves in the rotating direction of the disk, and a driving force transfer member screw-connected to a rotary shaft of the driving motor, moving in the rotating direction of the disk by the driving motor, and causing the wedge member to move in the rotating direction of the disk, comprising moving the wedge member to the left end of an operating section and recognizing the position of the left end, when a driver applies a pressure to a pedal; moving the wedge member to the right end of the operating section and recognizing the position of the right end, when the position of the left end is recognized; determining the middle position between the left end and the right end to be the central point of the entire moving distance; and recognizing the middle position as a reference position for controlling the braking of the wedge member.

The order of the recognition of the position of the left end and the recognition of the position of the right end may be reversed.

In accordance with another aspect, the present invention provides a method for recognizing the reference position of a wedge of a disk brake for vehicles, which has a disk rotating together with the rotation of a wheel of a vehicle, a movable friction pad rubbing against one surface of the disk and generating braking force, a wedge member having one surface, to which the movable friction pad is attached, and moving in the rotating direction of the disk and moving forward to the disk by a driving motor for generating driving force, a guide member guiding the wedge member to the disk when the wedge member moves in the rotating direction of the disk, and a driving force transfer member screw-connected to a rotary shaft of the driving motor, moving in the rotating direction of the disk by the driving motor, and causing the wedge member to move in the rotating direction of the disk, comprising moving the wedge member to the left of an operating section and recognizing a first position, where braking force starts to be generated by contact of the friction pad with the disk, when a driver applies a pressure to a pedal; moving the wedge member to the right of the operating section and recognizing a second position, where braking force starts to be generated by contact of the friction pad with the disk, when the first position is recognized; recognizing the middle position between the first and second positions as a reference position for controlling the brake of the wedge member; and driving the driving motor to perform the controlling of the brake of the wedge member, when the wedge member in the reference position deviates from the first or second position by a pressure continuously applied to the pedal by the user.

The method may further comprise not driving the driving motor, when the wedge member in the reference position does not deviate from the first or second position by the pressure continuously applied to the pedal by the user.

BRIEF DESCRIPTION OF THE DRAWINGS

These and/or other aspects and advantages of the invention will become apparent and more readily appreciated from the following description of the embodiments, taken in conjunction with the accompanying drawings in which.

DETAILED DESCRIPTION OF THE PREFERRED EMBODIMENTS

Reference will now be made in detail to the embodiments of the present invention, an example of which is illustrated in the accompanying drawings, wherein like reference numerals refer to like elements throughout. The embodiments are described below to explain the present invention by referring to the annexed drawings.

Figure 1:
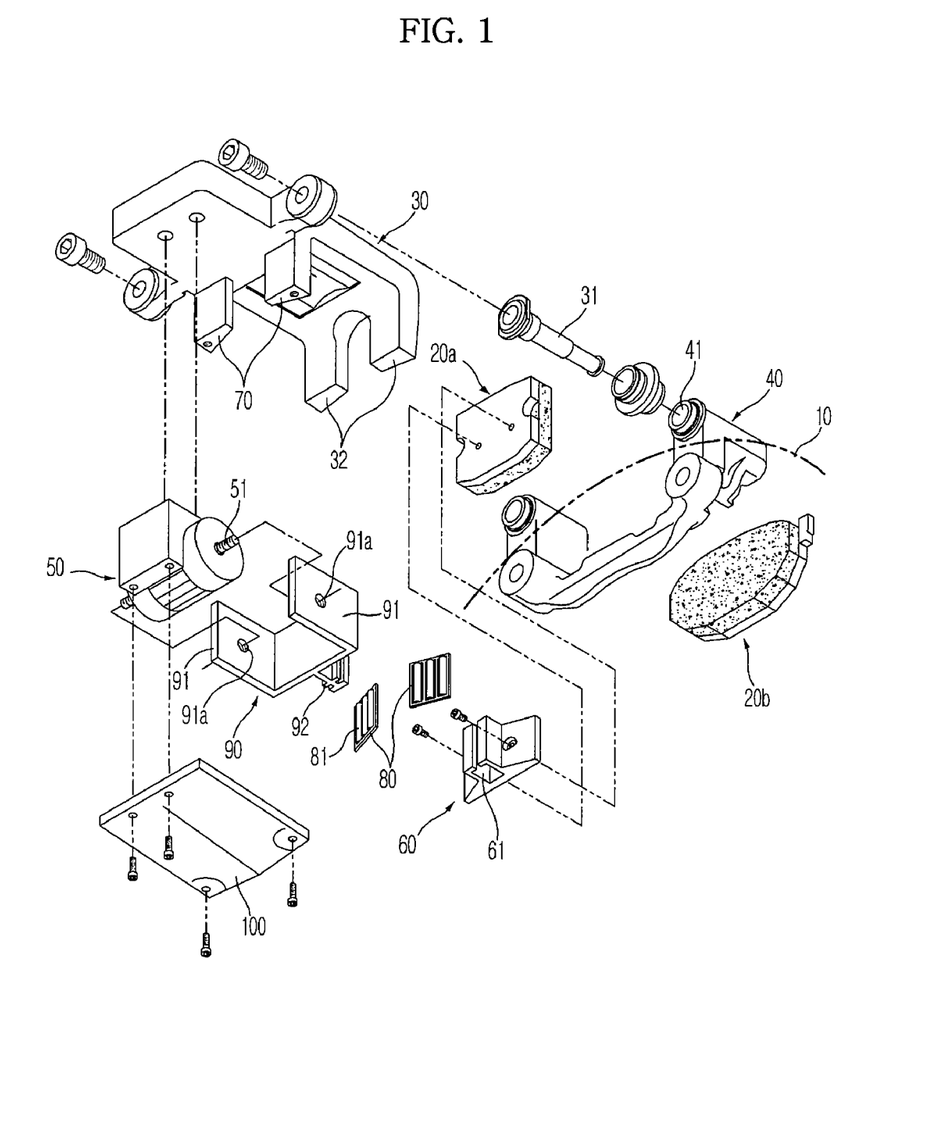
FIG. 1 is an exploded perspective view of a disk brake for vehicles in accordance with the present invention.
Figure 2:
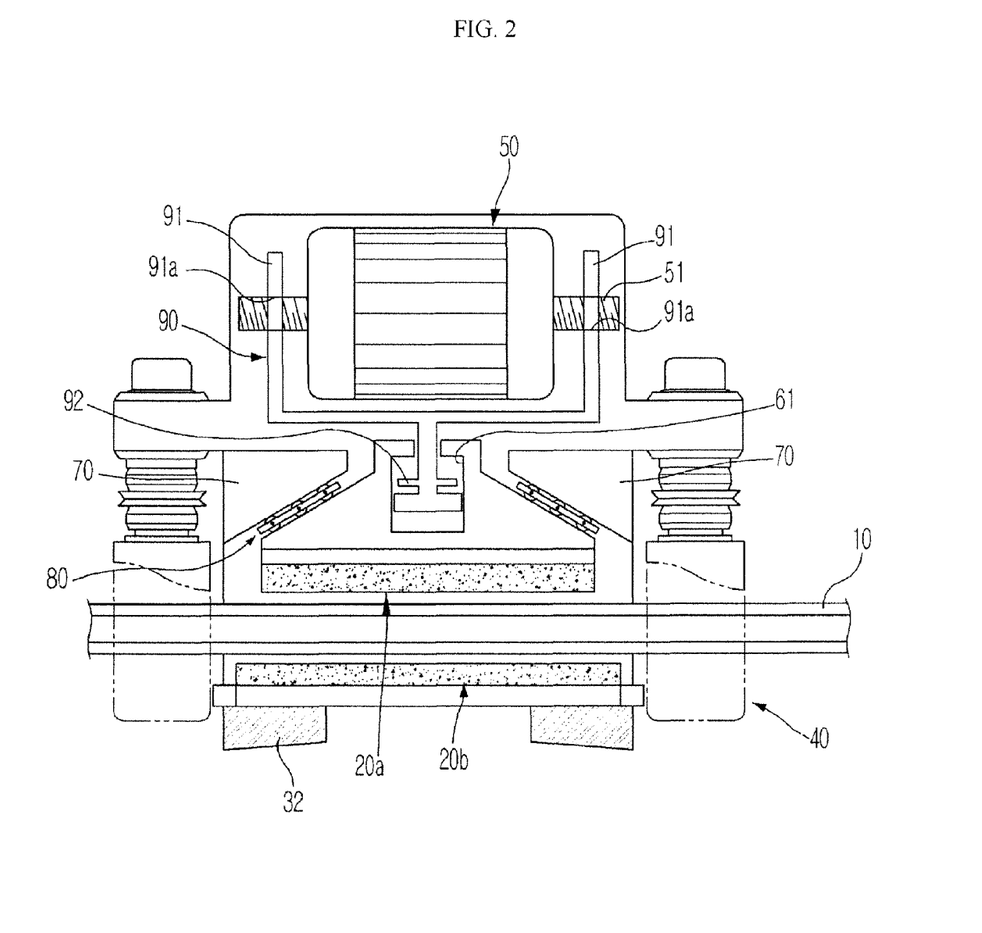
FIG. 2 is a schematic view of the disk brake for vehicles in accordance with the present invention in a brake releasing state.
Figure 3:
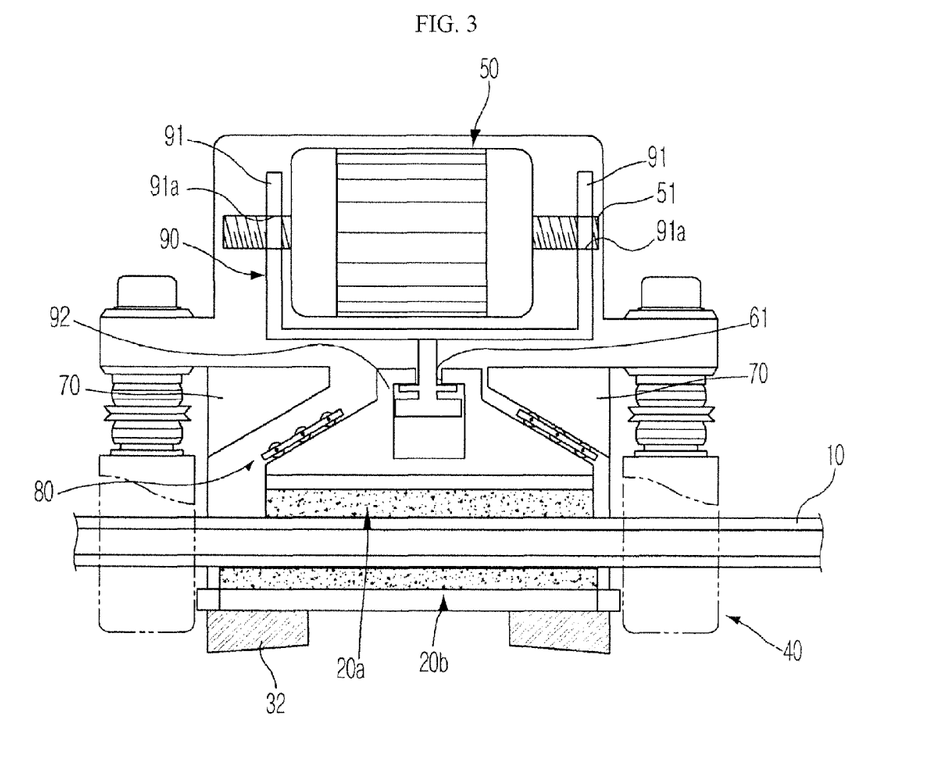
FIG. 3 is a schematic view of the disk brake for vehicles in accordance with the present invention in a braking state.

FIG. 1 is an exploded perspective view of a disk brake for vehicles in accordance with the present invention, FIG. 2 is a schematic view of the disk brake for vehicles in accordance with the present invention in a brake releasing state, and FIG. 3 is a schematic view of the disk brake for vehicles in accordance with the present invention in a braking state.

As shown in FIGS. 1 to 3, the disk brake for vehicles in accordance with the present invention, is an apparatus, which rubs friction pads 20a and 20b respectively against both surfaces of a disk 10 rotating together with the rotation of a wheel (not shown) of a vehicle, and thus obtains braking force. The disk brake for vehicles includes a caliper housing 30, in which a pair of the friction pads 20a and 20b is disposed such that they are opposite to each other, and a carrier 40 fixed to a knuckle unit (not shown) of the vehicle for allowing the caliper housing 30 installed on the knuckle unit such that the caliper housing 30 can move forward and backward.

In order to install the caliper housing 30 on the carrier 40 such that the caliper housing 30 can move forward and backward, a pair of guide rods 31, which moves forward into and backward out of the carrier 40, is fixed to both side end of the caliper housing 30 through connection members, such as screws, and guide holes 41, through which the guide rods 31 move forward into and backward out of the carrier 40, are respectively formed through both sides of the carrier 40.

A wedge member 60 and a guide member 70 are disposed at one side of the inside of the caliper housing 30, and a finger part 32 is provided at the other side of the inside of the caliper housing 30. The wedge member 60 is provided with the front surface, turning the disk 10, on which the friction pad 20a is installed, and moves forward to the disk 10 by the driving force transmitted from a driving motor 50 so as to rub the friction pad 20a against the disk 10. The guide member 70 is provided with the front surface directly or indirectly contacting the rear surface of the wedge member 60 and thus guides the wedge member 60 to the disk 10 when the wedge member 10 moves in the rotating direction of the disk 10. Further, the other friction pad 20b is installed on the finger part 32. In this embodiment, for convenience sake, the friction pad 20a, which is installed on the wedge member 60 and moves together with the movement of the wedge member 60, is referred to as a movable friction pad 20a, and the friction pad 20b, which is installed on the finger part 32, is referred to as a stationary friction pad 20b.

Further, bearings 80, each of which includes a plurality of rollers 81, are interposed between the front surface of the guide member 70 and the rear surface of the wedge member 60 so as to allow the wedge member 60 to more easily move. Thereby, the front surface of the guide member 70 and the rear surface of the wedge member 60 are indirectly supported by each other through the rollers 81.

The front surface of the wedge member 60 is disposed parallel with one surface of the disk 10 such that the movable friction pad 20a can uniformly contact one surface of the disk 10 on the whole, and the rear surface of the wedge member 60 is inclined at a designated angle toward the disk 10 such that at least one end, among both ends of the wedge member 60, located at the side of the rotating direction of the disk 10 forms a wedge shape.

The front surface of the guide member 70 is inclined corresponding to the rear surface of the wedge member 60 such that the guide member 70 can guide the wedge member 60 to the disk 10 when the wedge member 60 moves in the rotating direction of the disk 10.

Thus, when the wedge member 60 moves in the rotating direction of the disk 10 by the driving force transmitted from the driving motor 50, the rear surface of the wedge member 60 is guided by the front surface of the guide member 70 and moves forward to the disk 10, as shown in FIG. 3. Thus, the movable friction pad 20a installed on the wedge member 60 is pressed onto one surface of the disk 10 and rubs against the surface of the disk 10, thereby generating braking force. Further, when the movable friction pad 20a is pressed onto the disk 10, as described above, the caliper housing 30 moves backward in the opposite direction of the wedge member 60 by its repulsive force and thus the stationary friction pad 20b installed on the finger part 32 of the caliper housing 30 is pressed onto the other surface of the disk 10 and rubs against the other surface of the disk 10, thereby generating braking force.

Further, frictional force affecting between the movable friction pad 20a and the disk 10 under the condition that the movable friction pad 20a rubs against one surface of the disk 10 serves as force for more strongly interposing the wedge member 60 between the front surface of the guide member 70 and one surface of the disk, and thus it is possible to obtain a large braking force only using a small driving force.

In this embodiment, the rear surface of the wedge member 60 is inclined forwardly such that both sides of the rear surface of the wedge member 60 are symmetrical with respect to the center of the rear surface of the wedge member 60 and thus respectively have a wedge shape. The front surface of the guide member 70 has the center concaved backwardly and is inclined corresponding to the rear surface of the wedge member 60, and the guide member 70 can be applied to both right and left wheels of a vehicle.

The disk brake for vehicles of the present invention further includes driving force transfer member 90, which converts the rotational motion of a rotary shaft 51 rotated by the driving motor 50 into a rectilinear motion and transmits the rectilinear motion to the wedge member 60.

The driving force transfer member 90 is installed on the rotary shaft 51 of the driving motor 50, and thus moves forward and backward in the axial direction of the rotary shaft 51 by the driving motor 50. A male screw is formed on the outer circumferential surface of the rotary shaft 51 of the driving motor 50, and shaft installation holes 91a in shaft installation part 91 having a female screw formed on the inner circumferential surface thereof are formed through the driving force transfer member 90. Thereby, the driving force transfer member 90 rectilinearly moves according to the rotation of the rotary shaft 51. In this embodiment, since the driving force transfer member 90 moves the wedge member 60 in the rotating direction of the disk 10, the driving motor 50 is disposed such that the axial direction of the rotary shaft 51 is substantially parallel with the tangential direction of the disk 10.

The wedge member 60 moves in the rotating direction of the disk 10 by the driving force transfer member 90, and moves forward to the disk 10 such that the movable friction pad 20a can be pressed onto the disk 10. Thus, a guide part 92 extended to the wedge member 60 is provided on the central portion of the front surface of the driving force transfer member 90, and a concave guide hole 61 for receiving the guide part 92 such that the guide part 92 can move forward and backward is formed in the rear surface of the wedge member 60. Since the wedge member 60 is installed on the driving force transfer member 90 such that the wedge member 60 can move forward and backward through the guide part 92 and the guide hole 61, when the driving force transfer member 90 moves in the rotating direction of the disk 10 by the driving motor 50, the wedge member 60 moves in the rotating direction of the disk 10 and moves forward to the disk 10. Here, non-described reference numeral 100 represents a cover, which covers the driving motor 50 and the driving force transfer member 90 so as to support the driving force transfer member 90.

Figure 4:
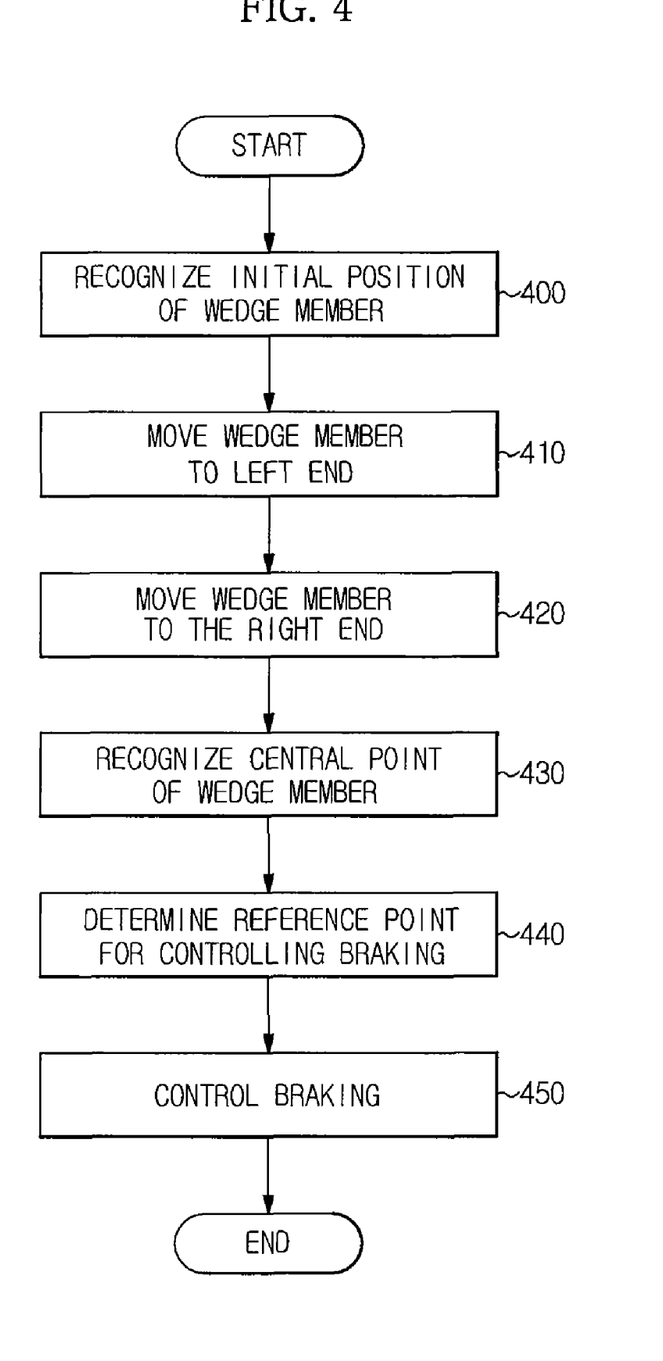
FIG. 4 is a flow chart illustrating a method for recognizing the reference position of a wedge of a disk brake for vehicles in accordance with a first embodiment of the present invention.
Figure 5:
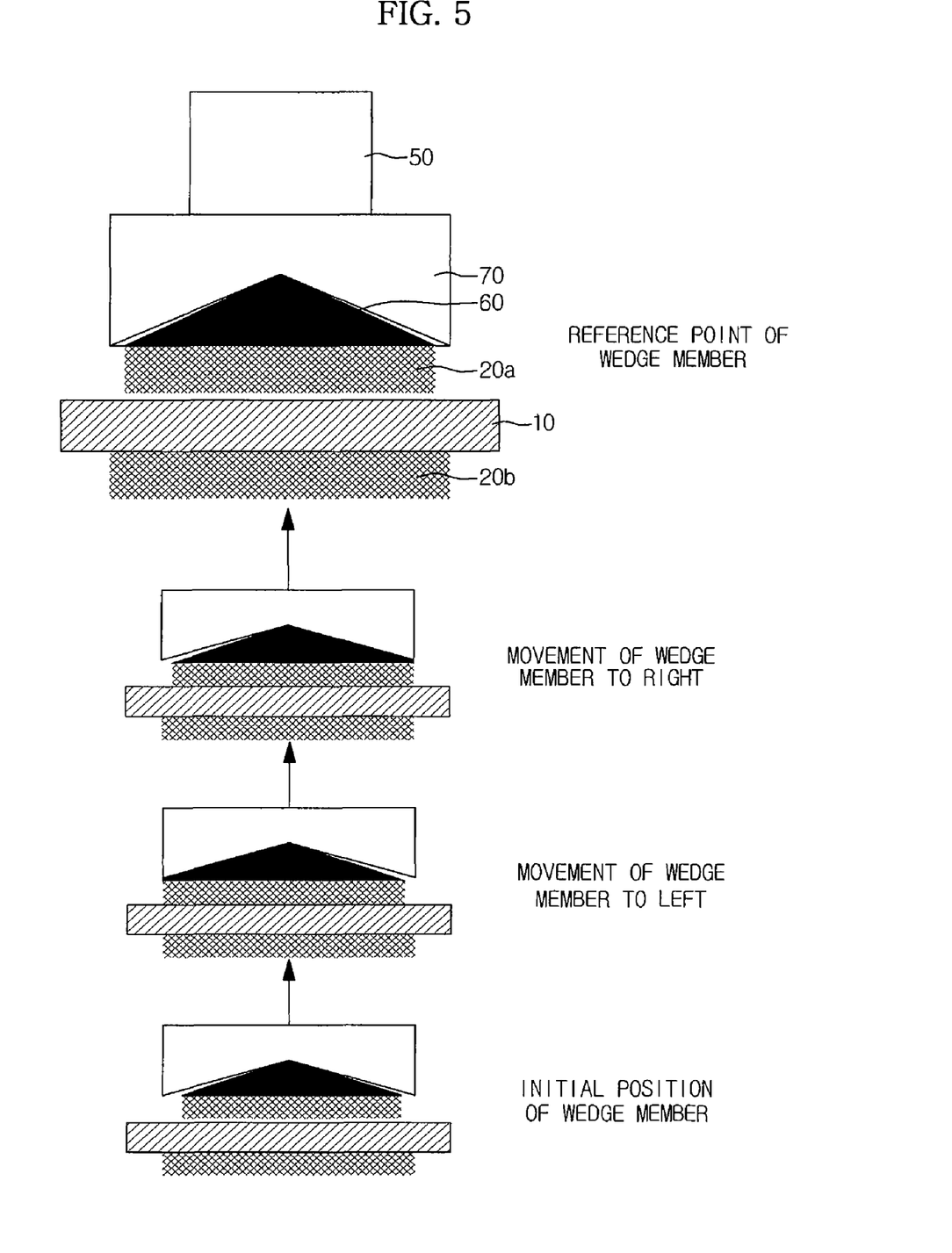
FIG. 5 is a view illustrating in detail the position of a wedge member in the method of FIG. 4 in accordance with the first embodiment.

Hereinafter, a method for recognizing the reference position of a wedge of a disk brake for vehicles in accordance with a first embodiment of the present invention will be described, with reference to FIGS. 4 and 5.

When a control unit (not shown) senses a pressure applied to a pedal by a user, the control unit recognizes the initial position of the wedge member 60 at a brake initial stage (400).

When the control unit recognizes the initial position of the wedge member 60, the control unit moves the wedge member 60 to the left end of an operating section, and then recognizes the position of the left end (410).

When the control unit recognizes the position of the left end, the control unit moves the wedge member 60 to the right end of the operating section, and then recognizes the position of the right end (420).

When the control unit recognizes the positions of both ends, the control unit determines the middle point between the left end and the right end to be the central point of the entire moving distance, and then recognizes this central point as a central point of the wedge member 60 (430).

The control unit determines the central point obtained in the step 430 to be a reference point for controlling the braking of the wedge member 60, i.e., a starting point (440). Then, the control unit moves the wedge member 60 to the central point, and performs the controlling of the braking of the wedge member 60 by recognizing the movement of the pedal by the user and the braking force (450).

Figure 6:
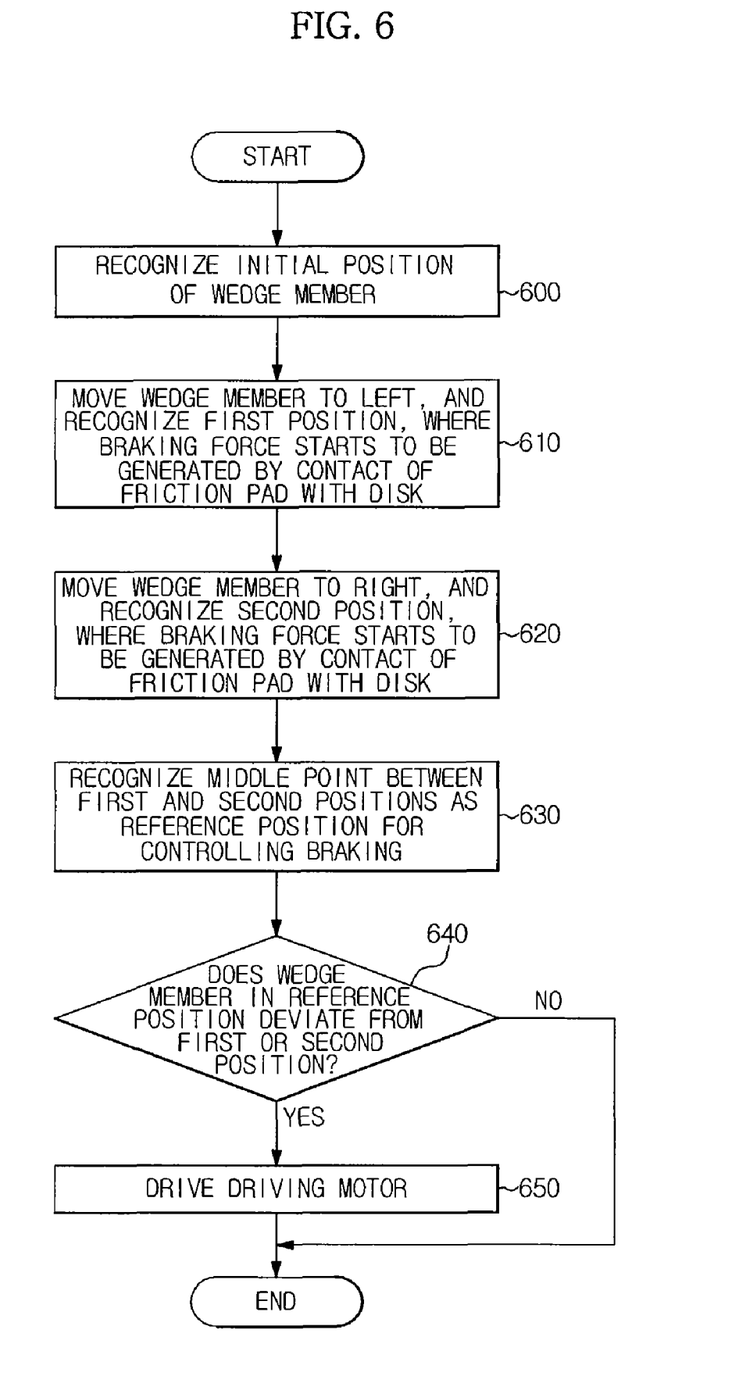
FIG. 6 is a flow chart illustrating a method for recognizing the reference position of a wedge of a disk brake for vehicles in accordance with a second embodiment of the present invention.
Figure 7:
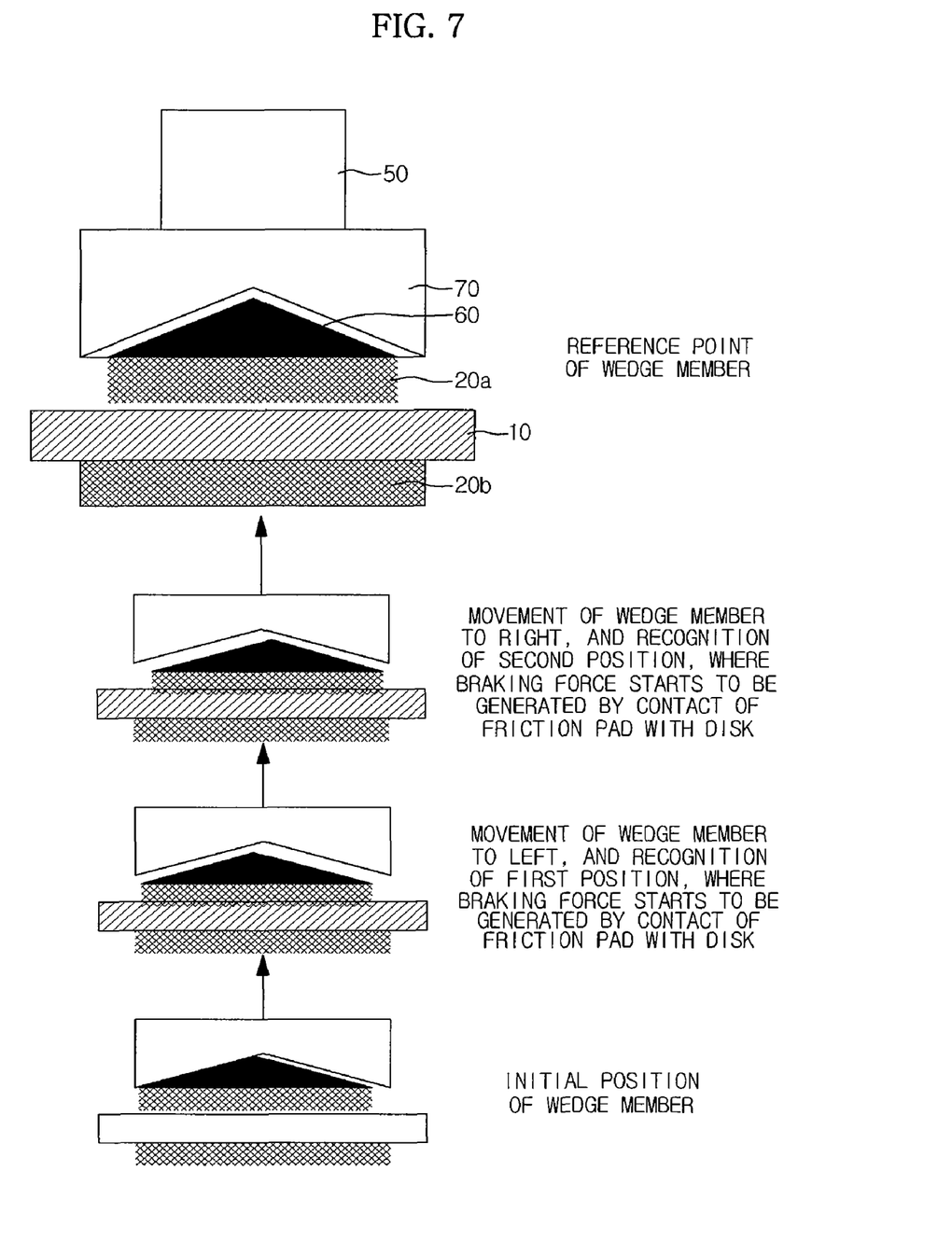
FIG. 7 is a view illustrating in detail the position of a wedge member in the method of FIG. 6 in accordance with the second embodiment.

Hereinafter, a method for recognizing the reference position of a wedge of a disk brake for vehicles in accordance with a second embodiment of the present invention will be described, with reference to FIGS. 6 and 7.

When a user applies a pressure to a pedal, a control unit (not shown) recognizes the initial position of the wedge member 60 (600).

When the control unit recognizes the initial position of the wedge member 60, the control unit moves the wedge member 60 to the left, and recognizes a first position, where braking force starts to be generated by contact of the friction pad 20a with the disk 10 (610).

When the control unit recognizes the first position, the control unit moves the wedge member 60 to the right, and recognizes a second position, where braking force starts to be generated by the contact of the friction pad 20a with the disk 10 (620).

When the control unit recognizes the first and second positions, the control unit recognizes the middle point between the first and second positions as a reference position (630) for controlling the braking of the wedge member 60.

When the control unit recognizes the reference position, the control unit determines whether or not the wedge member 60 in the reference position deviates from the first or second position by a pressure continuously applied to the pedal by the user (640).

When the wedge member 60 in the reference position deviates from the first or second position, the control unit determines that it is necessary to control the braking of the wedge member 60, and thus drives the driving motor 50 and performs the controlling of the braking of the wedge member 60 (650).

On the other hand, when the wedge member 60 in the reference position does not deviate from the first or second position, the control unit determines that it is not necessary to control the braking of the wedge member 60, and thus terminates the operation.

As apparent from the above description, the present invention provides a method for recognizing the reference position of a wedge of a disk brake for vehicles, in which the position of a wedge member is correctly recognized, thus safely controlling the disk brake according to the movement of a pedal by a driver and the braking force.

Further, the method of the present invention allows a driving motor to be driven only at a point of time when the controlling of the braking of the disk brake is required, thus reducing noise generated by the driving of the driving motor.

Although embodiments of the invention have been shown and described, it would be appreciated by those skilled in the art that changes may be made in these embodiments without departing from the principles and spirit of the invention, the scope of which is defined in the claims and their equivalents.

What is claimed is:

1. A method for recognizing a reference position of a wedge member of a disk brake for vehicles, which has a disk rotating together with the rotation of a wheel of a vehicle, a movable friction pad rubbing against one surface of the disk and generating braking force, the wedge member having one surface, to which the movable friction pad is attached, and moving in a rotating direction of the disk and moving forward to the disk by a driving motor for generating driving force, a guide member guiding the wedge member to the disk when the wedge member moves in the rotating direction of the disk, and a driving force transfer member screw-connected to a rotary shaft of the driving motor, moving in the rotating direction of the disk by the driving motor, and causing the wedge member to move in the rotating direction of the disk, the method comprising:

- moving the wedge member to a left end of an operating section and recognizing a position of the left end, when a driver applies a pressure to a pedal;
- moving the wedge member to a right end of the operating section and recognizing a position of the right end, when the position of the left end is recognized;
- determining a middle position between the left end and the right end to be a central point of the entire moving distance; and
- recognizing the middle position as a reference position for controlling braking of the wedge member.

2. The method according to claim 1, wherein an order of the recognition of the position of the left end and the recognition of the position of the right end is reversed.

3. A method for recognizing a reference position of a wedge member of a disk brake for vehicles, which has a disk rotating together with the rotation of a wheel of a vehicle, a movable friction pad rubbing against one surface of the disk and generating braking force, the wedge member having one surface, to which the movable friction pad is attached, and moving in a rotating direction of the disk and moving forward to the disk by a driving motor for generating driving force, a guide member guiding the wedge member to the disk when the wedge member moves in the rotating direction of the disk, and a driving force transfer member screw-connected to a rotary shaft of the driving motor, moving in the rotating direction of the disk by the driving motor, and causing the wedge member to move in the rotating direction of the disk, the method comprising:

- moving the wedge member to the left of an operating section and recognizing a first position, where braking force starts to be generated by contact of the friction pad with the disk, when a driver applies a pressure to a pedal;
- moving the wedge member to the right of the operating section and recognizing a second position, where braking force starts to be generated by contact of the friction pad with the disk, when the first position is recognized;
- recognizing a middle position between the first and second positions as a reference position for controlling braking of the wedge member; and
- driving the driving motor to perform the controlling of the braking of the wedge member, when the wedge member in the reference position deviates from the first or second position by a pressure continuously applied to the pedal by the driver.

4. The method according to claim 3, further comprising not driving the driving motor, when the wedge member in the reference position does not deviate from the first or second position by the pressure continuously applied to the pedal by the driver.

* * * * *